US00RE48458E

(19) United States
(12) Reissued Patent
Seo et al.

(10) Patent Number: US RE48,458 E
(45) Date of Reissued Patent: Mar. 2, 2021

(54) METHOD FOR PERFORMING HIGH-SPEED HANDOVER IN BASE STATION COOPERATIVE WIRELESS COMMUNICATION SYSTEM, AND DEVICE FOR SAME

(71) Applicant: LG ELECTRONICS INC., Seoul (KR)

(72) Inventors: Hanbyul Seo, Anyang-si (KR); Seungmin Lee, Anyang-si (KR); Hakseong Kim, Anyang-si (KR); Inkwon Seo, Anyang-si (KR)

(73) Assignee: LG ELECTRONICS INC., Seoul (KR)

(21) Appl. No.: 16/028,109

(22) Filed: Jul. 5, 2018

Related U.S. Patent Documents

Reissue of:
(64) Patent No.: 9,386,489
Issued: Jul. 5, 2016
Appl. No.: 14/386,102
PCT Filed: Mar. 11, 2013
PCT No.: PCT/KR2013/001943
§ 371 (c)(1),
(2) Date: Sep. 18, 2014
PCT Pub. No.: WO2013/141508
PCT Pub. Date: Sep. 26, 2013

U.S. Applications:
(60) Provisional application No. 61/612,952, filed on Mar. 19, 2012.

(51) Int. Cl.
*H04W 4/00* (2018.01)
*H04W 36/00* (2009.01)
(Continued)

(52) U.S. Cl.
CPC ..... *H04W 36/0077* (2013.01); *H04W 36/08* (2013.01); *H04W 36/38* (2013.01); *H04W 74/0833* (2013.01)

(58) Field of Classification Search
CPC ..... H04W 36/08; H04W 74/0833; H04W 36/0077; H04W 36/38
(Continued)

(56) References Cited

U.S. PATENT DOCUMENTS 6,707,803 B1 * 3/2004 Suk ..... H04W 36/12 370/331
2010/0093354 A1 * 4/2010 Agashe ..... H04W 36/04 455/436
(Continued)

FOREIGN PATENT DOCUMENTS

KR 10-2011-0043893 A 4/2011
KR 10-2011-0043893 A 4/2011
(Continued)

OTHER PUBLICATIONS

"3rd Generation Partnership Project; Technical Specification Group Radio Access Network; Coordinated multi-point operation for LTE physical layer aspects (Release 11)," 3GPP TR 36.819 V11.1.0, Dec. 2011, 70 pages.

*Primary Examiner* — Ovidio Escalante
(74) *Attorney, Agent, or Firm* — Birch, Stewart, Kolasch & Birch, LLP

(57) ABSTRACT

Disclosed in the present application is a method for a terminal to perform a handover in a wireless communication system. In particular, the method comprises the steps of: receiving a random access triggering signal from a serving cell; executing a random access procedure with a target cell on the basis of the random access triggering signal; receiving a downlink signal from the serving cell and transmitting an uplink signal to the target cell; receiving, from the serving cell, a message ordering a handover to the target cell; and transmitting, to the target cell, a predetermined message
(Continued)

indicating the completed handover, on the basis of the message ordering a handover.

13 Claims, 9 Drawing Sheets

(51) Int. Cl.
*H04W 36/08* (2009.01)
*H04W 36/38* (2009.01)
*H04W 74/08* (2009.01)

(58) Field of Classification Search
USPC ..... 370/310–350; 455/431–466
See application file for complete search history.

(56) References Cited

U.S. PATENT DOCUMENTS

2011/0098072 A1 4/2011 Kim et al.
2011/0292911 A1* 12/2011 Uemura ..... H04W 36/0072 370/331
2011/0317665 A1* 12/2011 Jung ..... H04W 24/02 370/331
2012/0034925 A1 2/2012 Noh et al.
2012/0100851 A1* 4/2012 Zheng ..... H04W 36/0094 455/436
2012/0142336 A1* 6/2012 Van Phan ..... H04W 36/0033 455/423
2012/0327904 A1 12/2012 Park et al.
2013/0084892 A1* 4/2013 Teyeb ..... H04W 4/023 455/456.6
2014/0029586 A1* 1/2014 Loehr ..... H04W 56/0005 370/336
2015/0111580 A1* 4/2015 Wu ..... H04W 36/0005 455/436

FOREIGN PATENT DOCUMENTS

KR 10-2012-0012711 A 2/2012
KR 10-2012-0012711 A 2/2012
WO WO 2011/073011 A1 6/2011
WO WO 2011/073011 A1 6/2011
WO WO 2011/112044 A2 9/2011
WO WO 2011/112044 A2 9/2011

* cited by examiner (a) Control-Plane Protocol Stack (b) User-Plane Protocol Stack

METHOD FOR PERFORMING HIGH-SPEED HANDOVER IN BASE STATION COOPERATIVE WIRELESS COMMUNICATION SYSTEM, AND DEVICE FOR SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application *is a reissue application of U.S. Pat. No. 9,386,489, issued Jul. 5, 2016* (*U.S. application Ser. No. 14/386,102 filed Sep. 18, 2014*), *which* is the National Phase of PCT International Application No. PCT/KR2013/001943, filed on Mar. 11, 2013, which claims priority under 35 U.S.C. 119(e) to U.S. Provisional Application No. 61/612,952, filed on Mar. 19, 2012, all of which are hereby expressly incorporated by reference into the present application.

TECHNICAL FIELD

The present invention relates to a wireless communication system and, more particularly, to a method for performing high-speed handover in an eNB-coordinated wireless communication system and an apparatus therefor.

BACKGROUND ART

As an example of a mobile communication system to which the present invention is applicable, a 3rd generation partnership project long term evolution (3GPP LTE) (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in the 3GPP. E-UMTS may be referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink (DL) or uplink (UL) transmission service to multiple UEs. Different cells may be configured to provide different bandwidths. The eNB controls data transmission and reception to and from a plurality of UEs. Regarding DL data, the eNB transmits DL scheduling information to notify a corresponding UE of a time/frequency domain within which data is to be transmitted, coding, data size, and hybrid automatic repeat and request (HARQ)-related information. In addition, regarding UL data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of the UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simplified structure, open interface, appropriate power consumption of a UE, etc. are required.

DETAILED DESCRIPTION OF THE INVENTION

Technical Problems

Based on the above-described discussion, the present invention proposes a method for performing high-speed handover in an eNB-coordinated wireless communication system and an apparatus therefor.

Technical Solutions

According to an aspect of the present invention, provided herein is a method for performing handover by a user equipment in a wireless communication system, including receiving a random access triggering signal from a serving cell; performing a random access procedure with a target cell based on the random access triggering signal; receiving a downlink signal from the serving cell and transmitting an uplink signal to the target cell; receiving a handover command message indicating handover to the target cell from the serving cell; and transmitting a prescribed message indicating completion of handover to the target cell based on the handover command message.

The handover command message may include information indicating that the random access procedure is omitted. The handover command message may include information about a temporary user equipment identity to be used by the user equipment in the target cell. The handover command message may include information for transmitting a scheduling request message by the user equipment to the target cell.

The serving cell may be a macro base station and the target cell may be a pico base station. The serving cell may be a primary component carrier and the target cell may be a secondary component carrier. In this case, the secondary component carrier may be reconfigured as the primary component carrier after the prescribed message is transmitted.

The prescribed message may be a scheduling request message. The random access triggering signal may be received through a physical control channel from the serving cell.

The method may further include receiving a downlink signal from the target cell and transmitting an uplink signal to the target cell, after transmitting the prescribed message, wherein a power control process of the user equipment is maintained before and after the prescribed message is transmitted.

Advantageous Effects

According to embodiments of the present invention, a UE can efficiently perform a handover procedure in an eNB-coordinated wireless communication system.

Effects according to the present invention are not limited to what has been particularly described hereinabove and other advantages not described herein will be more clearly understood by persons skilled in the art from the following detailed description of the present invention.

BEST MODE FOR CARRYING OUT THE INVENTION

Hereinafter, the structures, operations, and other features of the present invention will be understood readily from the embodiments of the present invention, examples of which are described with reference to the accompanying drawings. The embodiments, which will be described below, are examples in which the technical features of the present invention are applied to a 3GPP system.

Although the embodiments of the present invention will be described based on an LTE system and an LTE-advanced (LTE-A) system, the LTE system and the LTE-A system are only exemplary and the embodiments of the present invention can be applied to all communication systems corresponding to the aforementioned definition. In addition, although the embodiments of the present invention will herein be described based on frequency division duplex (FDD) mode, the FDD mode is only exemplary and the embodiments of the present invention can easily be modified and applied to half-FDD (H-FDD) mode or time division duplex (TDD) mode.

In this disclosure, the term base station (BS) may be used as term broadly including a remote radio head (RRH), an eNB, a transmission point (TP), a reception point (RP), and a relay and may also be referred to as a node.

Figure 1:
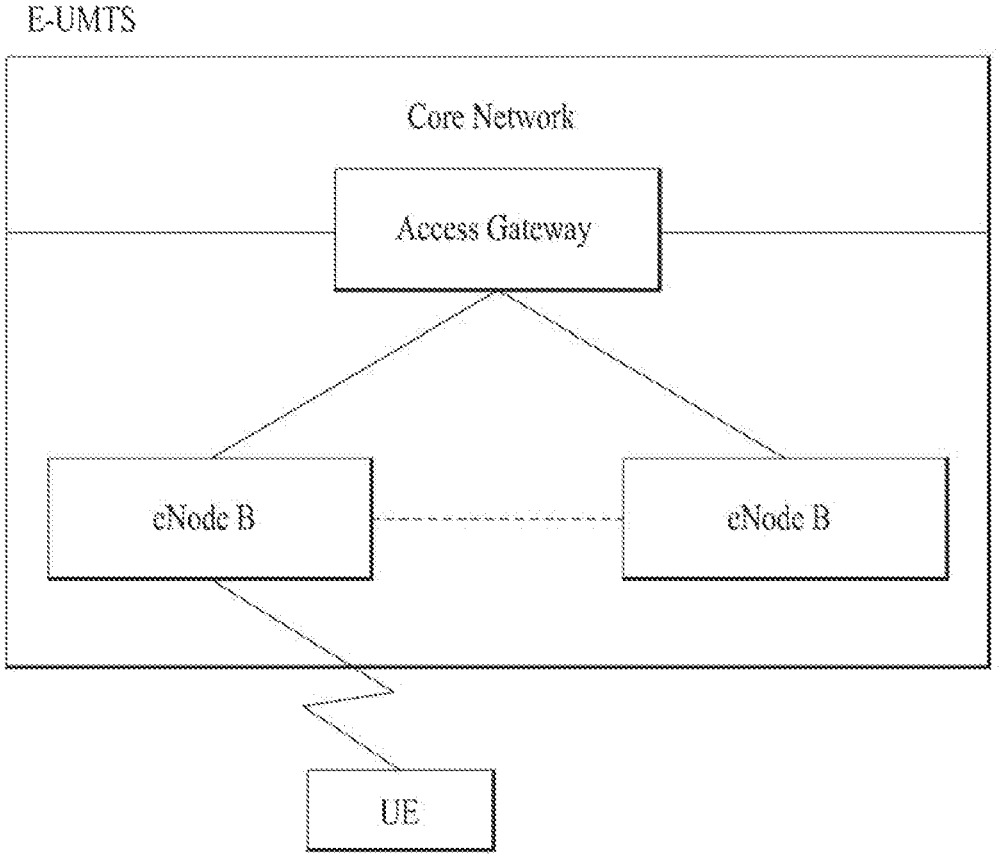
FIG. 1 is a diagram schematically illustrating a network structure of an E-UMTS as an exemplary radio communication system.
Figure 2:
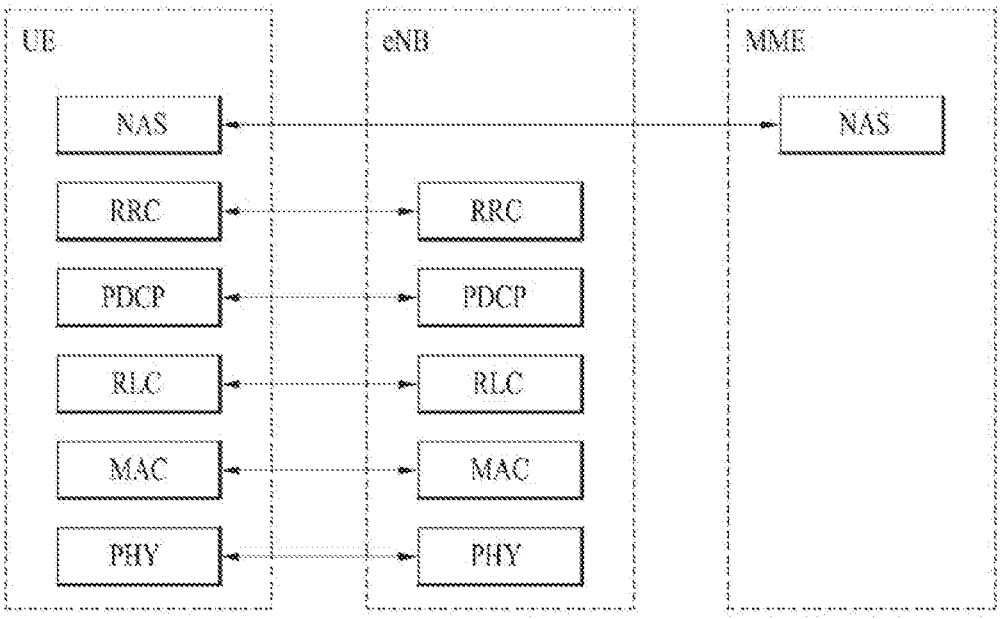
FIG. 2 is a diagram illustrating structures of a control plane and a user plane of a radio interface protocol between a UE and an E-UTRAN based on the 3GPP radio access network specification.
Figure 2:
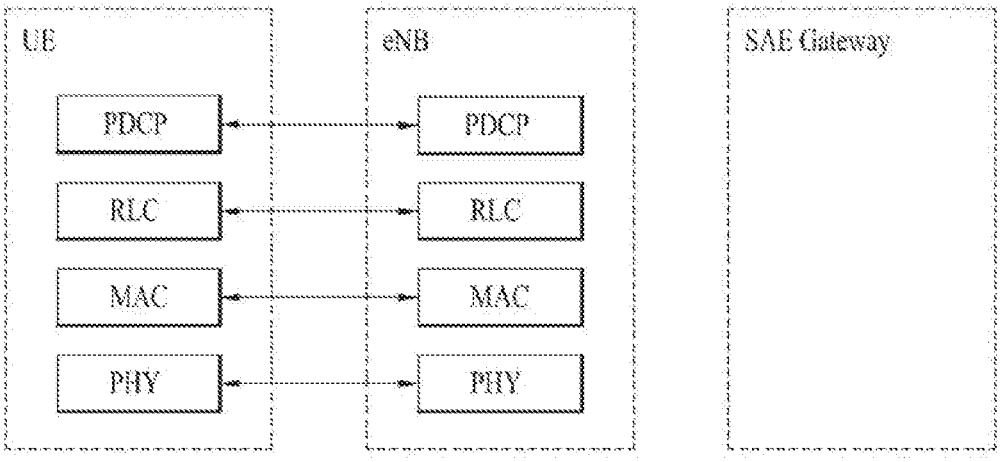

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer, which is a first layer, provides an information transfer service to an upper layer using a physical channel. The physical layer is connected to a media access control (MAC) layer of an upper layer via a transmission channel (an antenna port channel). Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an OFDMA scheme in DL and is modulated using an SC-FDMA scheme in UL.

The MAC layer, which is a second layer, provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

One cell constituting an eNB is configured to use one of bandwidths of 1.4, 3, 5, 10, and 20 MHz to provide a DL or UL transmission service to a plurality of UEs. Different cells may be configured to provide different bandwidths.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
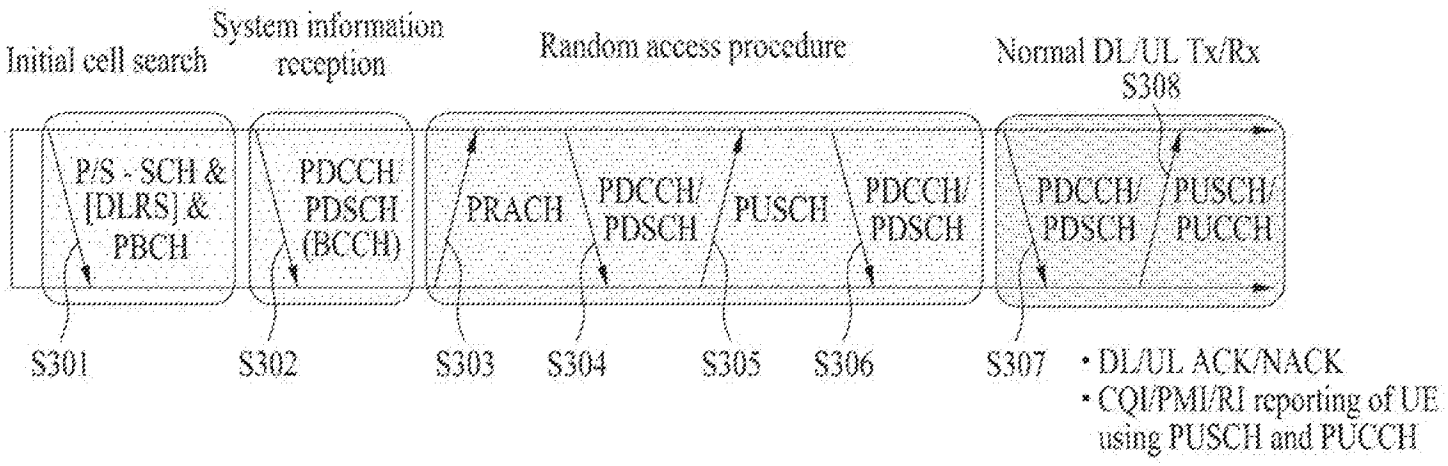
FIG. 3 is a diagram for explaining physical channels used in a 3GPP system and a general signal transmission method using the same.

FIG. 3 is a diagram for explaining physical channels used in a 3GPP system and a general signal transmission method using the same.

A UE performs initial cell search such as establishment of synchronization with an eNB when power is turned on or the UE enters a new cell (step S301). The UE may receive a primary synchronization channel (P-SCH) and a secondary synchronization channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a downlink reference signal (DL RS) in the initial cell search step to confirm a DL channel state.

Upon completion of initial cell search, the UE may receive a physical downlink control channel (PDCCH) and a physical downlink shared channel (PDSCH) according to information carried on the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a physical random access channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a physical uplink shared channel (PUSCH)/physical uplink control channel (PUCCH) (step S308) according to a general UL/DL signal transmission procedure. Especially, the UE receives downlink control information (DCI) through the PDCCH. The DCI includes control information such as resource allocation information for the UE and has different formats according to use purpose.

Meanwhile, control information, transmitted by the UE to the eNB through UL or received by the UE from the eNB through DL, includes a DL/UL acknowledgment/negative acknowledgment (ACK/NACK) signal, a channel quality indicator (CQI), a precoding matrix index (PMI), a rank indicator (RI), and the like. In the case of the 3GPP LTE system, the UE may transmit control information such as CQI/PMI/RI through the PUSCH and/or the PUCCH.

Figure 4:
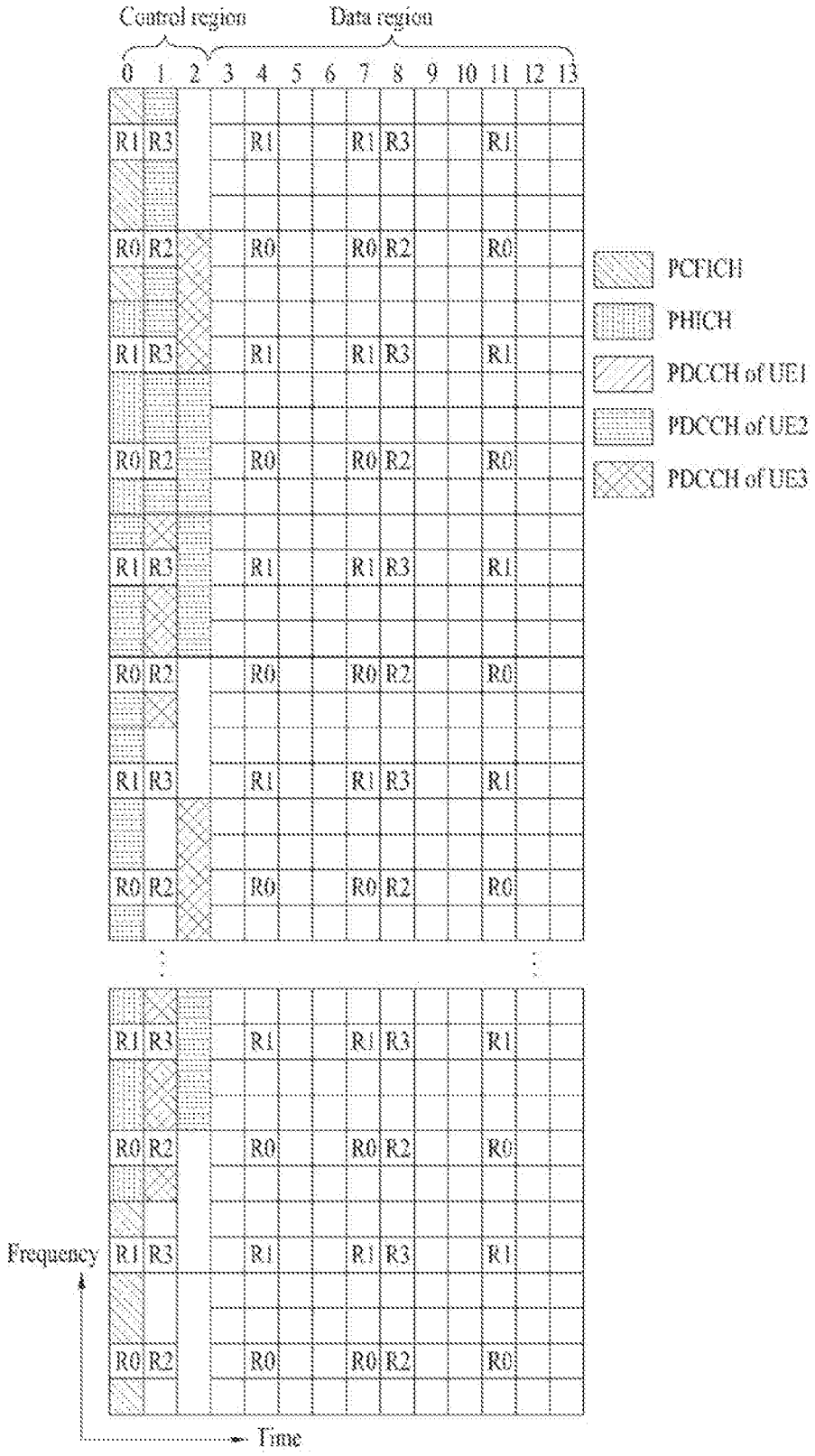
FIG. 4 is a diagram illustrating the structure of a DL radio frame used in an LTE system.

FIG. 4 is a diagram illustrating control channels contained in a control region of one subframe in a DL radio frame.

Figure 5:
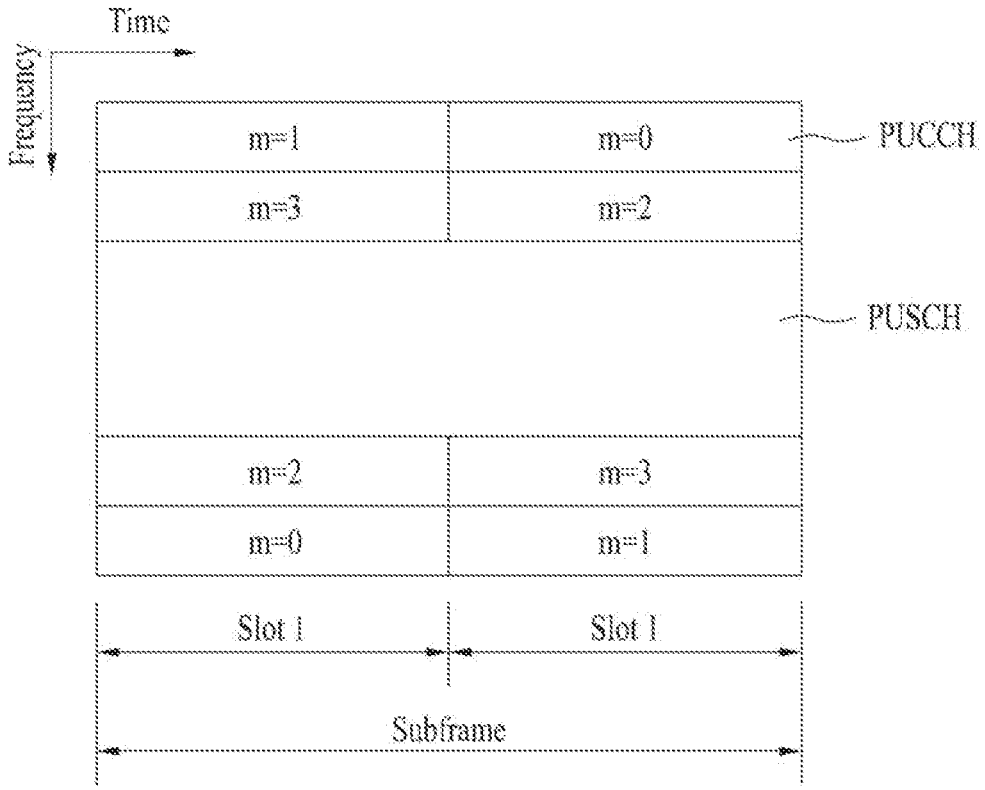
FIG. 5 is a diagram illustrating the structure of a UL subframe used in the LTE system.

Referring to FIG. 4, one subframe includes 14 OFDM symbols. The first to third ones of the 14 OFDM symbols may be used as a control region and the remaining 13 to 11 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 resource element groups (REGs) and each of the REGs is distributed in the control region based on a cell ID. One REG includes 4 resource elements (REs). The RE indicates a minimum physical resource defined as one subcarrier×one OFDM symbol. The PCFICH value indicates a value of 1 to 3 or a value of 2 to 4 depending on bandwidth and is modulated by quadrature phase shift keying (QPSK).

The PHICH, physical Hybrid-ARQ indicator channel, is used to transmit a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated by binary phase shift keying (BPSK). The modulated ACK/NACK signal is spread by a spreading factor (SF) of 2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in the frequency domain and/or the time domain.

The PDCCH, physical DL control channel, is allocated to the first n OFDM symbols of a subframe. In this case, n is an integer greater than 1 and is indicated by the PCFICH. The PDCCH is comprised of one or more control channel elements (CCEs). The PDCCH informs each UE or UE group of information associated with resource allocation of a paging channel (PCH) and a downlink-shared channel (DL-SCH), UL scheduling grant, HARQ information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is cyclic redundancy check (CRC)-masked with a radio network temporary identity (RNTI) 'A' and information about data, that is transmitted using radio resources 'B' (e.g. frequency location) and transport format information 'C' (e.g. transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

FIG. 5 is a diagram illustrating the structure of a UL subframe used in the LTE system.

Referring to FIG. 5, a UL subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a DL channel state, an RI for multiple input and multiple output (MIMO), a scheduling request (SR) indicating a request for allocation of UL resources, etc. A PUCCH of a UE occupies one RB in a different frequency in each slot of a subframe. That is, two RBs allocated to the PUCCH frequency-hop over the slot boundary. Particularly, FIG. 5 illustrates an example in which PUCCHs for m=0, m=1, m=2, and m=3 are allocated to a subframe.

Hereinafter coordinated multi point (CoMP) scheme will be described.

It is expected that the next-generation mobile communication standard, LTE-A, will support CoMP transmission which has not been supported in the legacy LTE standard, in order to increase data transmission rate. CoMP refers to a transmission scheme for communication with a UE through cooperation among two or more eNBs or cells in order to increase communication performance between a UE located in a shadow area and an eNB (a cell or sector).

CoMP transmission schemes may be classified into CoMP-joint processing (CoMP-JP) called cooperative MIMO characterized by data sharing and CoMP-coordinated scheduling/beamforming (CoMP-CS/CB).

In DL CoMP-JP, a UE may instantaneously receive data simultaneously from eNBs that perform CoMP transmission and may combine the received signals (joint transmission (JT)), thereby increasing reception performance. In addition, one of the eNBs participating in the CoMP transmission may transmit data to the UE at a specific time point (dynamic point selection (DPS)). In contrast, in DL CoMP-CS/CB, a UE may receive data instantaneously from one eNB, that is, a serving eNB, by beamforming.

In UL CoMP-JP, eNBs may receive a PUSCH signal from a UE at the same time (joint reception (JR)). In contrast, in UL CoMP-CS/CB, only one eNB receives a PUSCH from a UE. Here, cooperative cells (or eNBs) may make a decision as to whether to use CoMP-CS/CB.

A random access procedure defined in an LTE system will be described below. In the LTE system, the random access procedure is divided into a contention based random access procedure and a non-contention based random access procedure, which will be described in more detail with reference to FIGS. 6 and 7.

Figure 6:
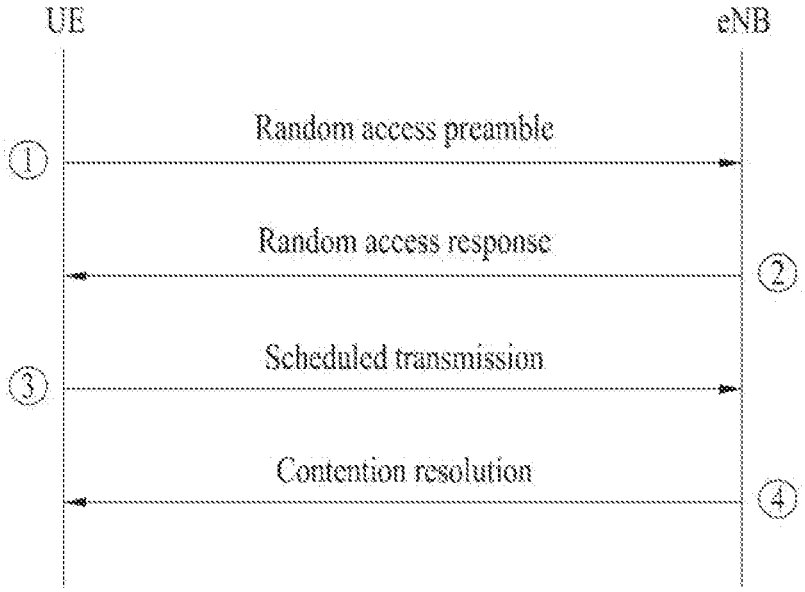
FIG. 6 is a diagram illustrating a contention based random access procedure of a random access process of an LTE system.

FIG. 6 illustrates an operation between a UE and an eNB in a contention based random access procedure.

In the contention based random access procedure, the UE may randomly select a random access preamble from a group of random access preambles indicated by system information or a handover command, select PRACH resources on which the random access preamble can be transmitted, and transmit the selected random access preamble to the eNB (step 1).

After transmitting the random access preamble, the UE may attempt to receive a response to the random access preamble within a random access preamble reception window indicated by the system information or the handover command (step 2).

Specifically, random access information may be transmitted in a MAC protocol data unit (PDU) and the MAC PDU may be transmitted on a PDSCH. In addition, a PDCCH is transmitted so that the UE may appropriately receive information on the PDSCH. That is, the PDCCH delivers information about a UE to receive the PDSCH, time and frequency information about radio resources of the PDSCH, and information about a transport format of the PDSCH. Upon successful receipt of the PDCCH, the UE may appropriately receive a random access response on the PDSCH based on information of the PDCCH. The random access response may include an ID of a random access preamble, a UL grant, a temporary cell RNTI (C-RNTI), a time alignment command (TAC), etc. Especially, the ID of the random access preamble may be identical to the ID of the random access preamble selected by the UE in step 1.

Upon receipt of the valid random access response, the UE may process the information included in the random access response. That is, the UE stores the C-RNTI. Further, the UE uses the UL grant to transmit data stored in a buffer or new data to the eNB (step 3).

In the contention based random access procedure, an ID of the UE should be included in data carried by the UL grant. This is because the eNB cannot identify which UEs perform the random access procedure and should identify UEs later for contention resolution.

A UE ID may be included in a UL grant by two methods. One of the methods is to transmit a cell ID of the UE through a UL grant in relation to whether the UE has already received a valid cell ID assigned to the cell of the UE before the random access procedure. The other method is to transmit a unique ID of the UE, if the UE has not received the valid cell ID before the random access procedure. In general, the unique ID of the UE is longer than the cell ID. If the UE transmits the data through the UL grant in step 3, the UE starts a contention resolution timer.

After transmitting the data along with the ID through the UL grant included in the random access response, the UE awaits receipt of an indication for contention resolution from the eNB. That is, the UE attempts to receive a PDCCH in order to receive a specific message (step 4).

The PDCCH may be received in two methods. As described before, if the LIE ID transmitted through the UL grant is the cell ID, the UE attempts to receive a PDCCH using the cell ID thereof. If the UE ID transmitted through the UL grant is the unique ID of the UE, the UE attempts to receive a PDCCH using the temporary C-RNTI included in the random access preamble.

In the former case, upon receipt of a PDCCH using the cell ID before expiration of the contention resolution timer, the UE determines that the random access procedure is successful and completes the random access procedure.

In the latter case, upon receipt of a PDCCH using the temporary C-RNTI before expiration of the contention resolution timer, the UE checks data received on a PDSCH indicated by the PDCCH. If the unique ID of the UE is included in the data, the UE determines that the random access procedure is successful and completes the random access procedure.

Figure 7:
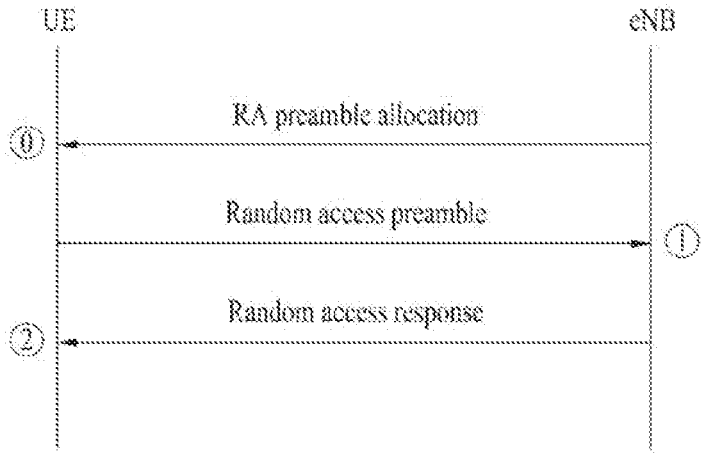
FIG. 7 illustrates a non-contention based random access procedure of a random access process of an LTE system.

FIG. 7 illustrates an operation between an eNB and a UE in a non-contention based random access procedure. Compared to the contention based random access procedure, upon receipt of random access response information in response to a random access preamble, the UE determines that the random access is successful in non-the contention based random access procedure, thereby completing the random access procedure.

In general, the non-contention based random access procedure is performed in two cases: during handover and by request of an eNB. The contention based random access procedure may also be performed in these two cases. It is important for the UE to receive a dedicated random access preamble from the eNB without contention. A handover command and a PDCCH command may be generated to allocate the random access preamble. When the eNB allocates the dedicated random access preamble to the UE, the UE transmits the preamble to the eNB. Subsequently, random access response information is received in the same manner as in the contention based random access procedure.

When the eNB commands the UE to start the non-contention random access procedure, the non-contention random access procedure is initiated. In this case, the eNB selects a specific preamble for use in the random access procedure and directly indicates the specific preamble to the UE. For example, if the eNB notifies the UE of 4 as a random access preamble identifier (RAPID) (i.e. RAPID-4), the UE may perform the non-contention random access procedure using a specific preamble corresponding to RAPID=4.

The present invention proposes a method for rapidly performing inter-cell handover by the UE in a CoMP situation in which signals are transmitted and received through cooperation among multiple cells.

Figure 8:
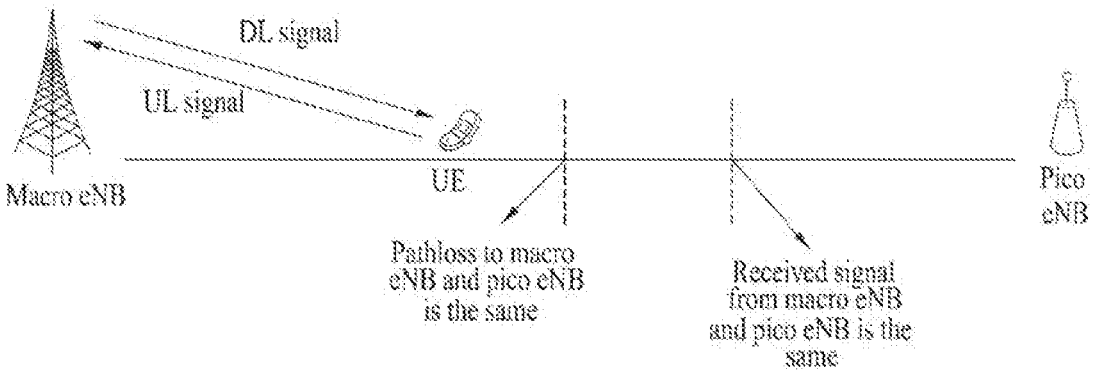
FIGS. 8 to 10 are diagrams illustrating a CoMP operation according to a location of a UE and a handover scheme according the present invention.
Figure 9:
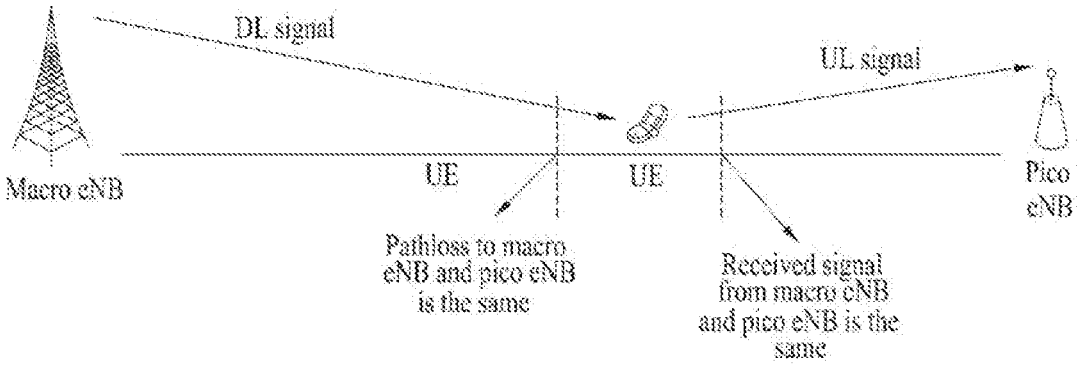
Figure 10:
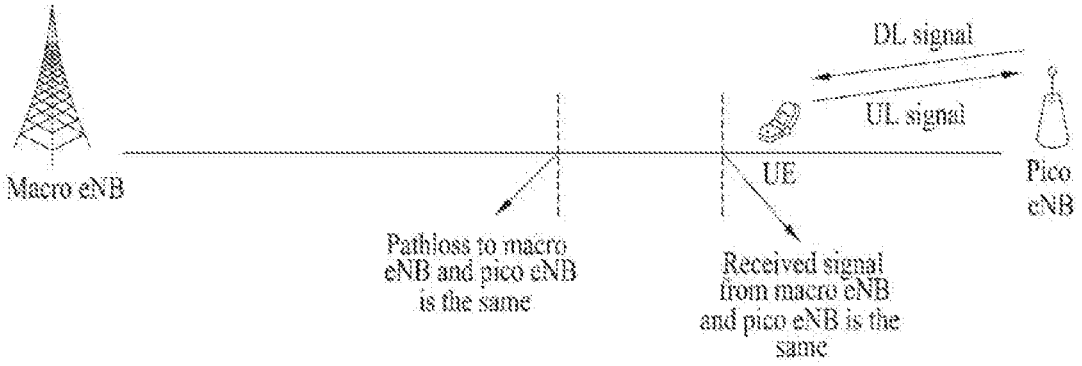

FIGS. 8 to 10 are diagrams for explaining a CoMP operation according to the location of a UE and a handover scheme according to the present invention. Especially, in FIGS. 8 to 10, it can be appreciated that there are a point at which pathloss of a UL signal transmitted by a UE to a macro eNB is the same as pathloss of a UL signal transmitted by the UE to a pico eNB and a point at which signal strength received from the macro eNB is the same as signal strength received from the pico eNB.

Referring to FIG. 8, the UE receives a DL signal from the macro eNB and simultaneously transmits a UL signal to the macro eNB. Next, if the UE moves towards the pico eNB, the UE receives the DL signal from the macro eNB and simultaneously transmits the UL signal to the pico eNB as illustrated in FIG. 9. In this case, since the UE is nearer to the pico eNB than to the macro eNB, transmission of the UL signal to the pico eNB is advantageous in that the same received quality is provided at a lower transmit power. However, it is desirable to receive the DL signal from the macro eNB in that a stronger DL signal is received since the transmit power of the macro eNB is higher than that of the pico eNB. As a result, a CoMP operation is performed in which the UE receives the DL signal from the macro eNB and transmits the UL signal to the pico eNB. Especially, in a situation as illustrated in FIG. 9, the UE needs to acquire synchronization to transmit the UL signal to the pico eNB and a random access procedure for synchronization acquisition may be triggered by an order on a PDCCH.

Next, if the UE further moves towards the pico eNB, since the DL signal from the pico eNB is received with stronger strength than the DL signal from the macro eNB as illustrated in FIG. 10, both the DL signal and the UL signal are transmitted and received through the pico eNB. Generally, handover refers to change of a cell from which a control channel is received. The UE is handed over from the macro eNB to the pico eNB in the process of FIGS. 8 to 10.

In a general handover situation, a serving cell commands a UE to perform handover to a specific target cell by transmitting a handover command to the UE and upon receipt of the handover command, the UE performs a random access procedure by transmitting a random access preamble to the target cell. The handover command may include a preamble index and the UE may perform a non-contention based random access procedure using a preamble indicated by the preamble index. Alternatively, the handover command may not include the preamble index. In this case, the UE may perform contention based random access process using an arbitrary preamble.

Meanwhile, when the UE hands over to the pico eNB as illustrated in FIG. 10 in the CoMP situation as illustrated in FIG. 9, the UE does not need to identify a UL transmission timing through an additional random access procedure because the UE has already performed UL transmission to the target cell. In other words, because the UE has already performed UL transmission to the pico eNB in FIG. 9, the pico eNB has identified a UL transmission timing of the UE at this timing. Accordingly, in a process in which the UE performs handover by moving to a location illustrated in FIG. 10, the pico eNB can identify the UL transmission timing of the UE even if an additional random access procedure is omitted. Accordingly, the present invention proposes minimizing a delay time consumed in handover by omitting an unnecessary random access procedure when the UE performs handover in a CoMP situation.

Referring hack to FIGS. 9 and 10, the serving cell of the UE, i.e. the macro eNB in FIG. 9, transmits a command for handover to the pico eNB to the UE. In this case, the macro eNB commands the UE to perform handover for omitting a random access procedure through an additional indicator. This indicator may be indicated by defining a field explicitly indicating whether to perform the random access procedure or through implicit signaling which is interpreted as omitting the random access procedure when parameters necessary for the random access procedure are not present. As an example, if a C-RNTI or a temporary C-RNTI to be used by the UE in a target cell has been transmitted through a handover command but the handover command does not include information to be used for the random access procedure, for example, a preamble index to be used for the random access procedure, this may be interpreted as omitting the random access procedure.

Upon receiving the handover command through such a process, the UE may directly receive the DL, signal of the pico eNB by omitting the random access procedure. In this case, the C-RNTI transmitted through the handover command may be used. In addition, the UE performs UL transmission based on a control signal of the pico eNB immediately after handover and, in this case, the UE may operate while maintaining an existing timing advance (TA) value or an existing power control value. If the UE has transmitted a UL signal to a plurality of cells, since the UE might use a plurality of TA values or a plurality of power control values, the UE may indicate [may indicate] which TA value or power control value is maintained through the handover command.

When the UE operates to directly receive a control channel of the target cell without using the random access procedure after handover as in the present invention, if a valid control channel signal is not received from the target cell for a predetermined time, the UE determines that handover has failed and receives the control channel from an original serving cell.

Hereinafter, additional information transmitted to the UE in a handover situation in which the above described random access procedure is omitted will be described in more detail. The additional information may be included in a handover command.

The additional information may include a C-RNTI which is to be used by the UE after handover to a target cell. To aid in a C-RNTI transfer operation, the macro eNB and the pico eNB may exchange a handover preparation signal through a backhaul link. For example, the macro eNB, which is a serving cell, may inform the pico eNB of an ID of a UE which is to perform handover to the pico eNB. Especially, the macro eNB may inform the pico eNB that a corresponding UE is performing a CoMP operation in the pico eNB and simultaneously may request a C-RNTI to be used by the UE after handover. As a response to a C-RNTI request, the pico eNB may inform the macro eNB of information about the C-RNTI to be used by the UE. Alternatively, the macro eNB, which is a serving cell, transmits a temporary C-RNTI to be used by the UE in the pico eNB, which is a target cell, to the UE and the UE transmits a prescribed message masked with the temporary C-RNTI to the target cell based on a timing and a resource indicated by the handover command. The prescribed message transmitted using the temporary C-RNTI may have the same format as a format (i.e. message 3 of FIG. 9) transmitted using a temporary C-RNTI in an existing random access procedure.

The additional information may also include scheduling request configuration information to be used by the UE after handover to the target cell. Instead of performing the random access procedure with respect to the target cell, the UE may transmit a scheduling request message to the target cell by using the scheduling request configuration information and transmit, as a response to the scheduling request message, information thereof and a message indicating that handover has been completed to the target cell by using a resource allocated by the target cell. Especially, upon receiving the handover command, the UE may be defined to transmit the scheduling request message using the scheduling request configuration information within a predetermined time. This is because the target cell will transmit a control channel after the UE transmits the scheduling request message since the scheduling request message may be interpreted as completion of handover of the UE (i.e. change of a cell receiving a DL control channel) although the UE should be capable of receiving the control channel from the target cell from a timing at which the scheduling request message is transmitted.

Meanwhile, such a handover scheme omitting the random access procedure may be applied even to a replacement process of a primary component carrier (or a primary cell (PCell)) in a wireless communication system to which carrier aggregation is applied. That is, in a process in which a secondary component carrier (or a secondary cell (SCell)) is reconfigured as the primary component carrier, since a UL transmission timing to the secondary component carrier has already been acquired and the replacement process of the primary component carrier conforms to a handover process, the handover scheme of the present can be applied.

Figure 11:
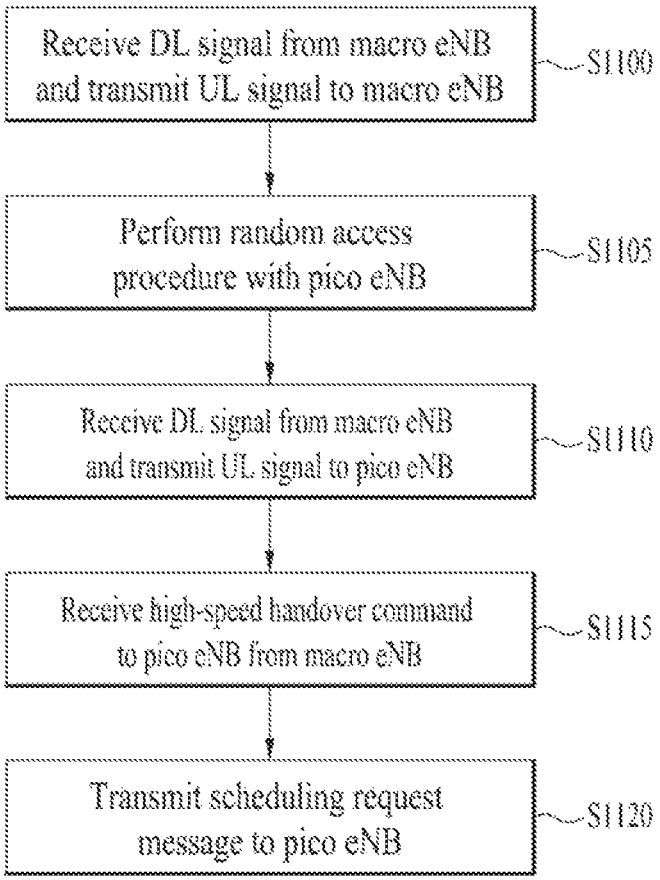
FIG. 11 is a flowchart illustrating an exemplary handover process of a UE according to an embodiment of the present invention.

FIG. 11 is a flowchart illustrating an example of performing a handover process by a UE according to an embodiment of the present invention. Especially, FIG. 11 illustrates the case in which the UE transmits a scheduling request message indicating that handover has been completed.

Referring to FIG. 11, in step 1100, the UE may receive a DL signal from a macro eNB and simultaneously transmit a UL signal to the macro eNB as illustrated in FIG. 8. Namely, step 1100 may correspond to a process before a CoMP scheme is applied.

Next, when the UE moves towards a pico eNB, the UE may perform a random access procedure for UL synchronization acquisition with the pico eNB in step 1105 according to a PDCCH received from the macro eNB. After UL synchronization acquisition, the UE operates in CoMP mode to receive the DL signal from the macro eNB and simultaneously transmit a UL signal to the pico eNB in step 1110 (refer to FIG. 9).

If the UE further moves toward the pico eNB (refer to FIG. 10), the UE may receive, from the macro eNB, a handover command message indicating that handover to the pico eNB should be performed in step 1115. The handover command message is desirably a high-speed handover message according to the present invention.

As described above, the high-speed handover command message may include scheduling request configuration information to be used after handover. Upon receiving the high-speed handover message, the UE may immediately transmit a scheduling request message to the pico eNB without an additional random access procedure.

Accordingly, the UE may transmit the scheduling request message to the target cell using the scheduling request configuration information in step 1120. Especially, the UE, which has received the handover command, needs to transmit the scheduling request message using the scheduling request configuration information within a predetermined time. In addition, as described above, the UE may receive a DL control channel from the pico eNB, which is the target cell, from a timing at which the scheduling request message is transmitted.

Figure 12:
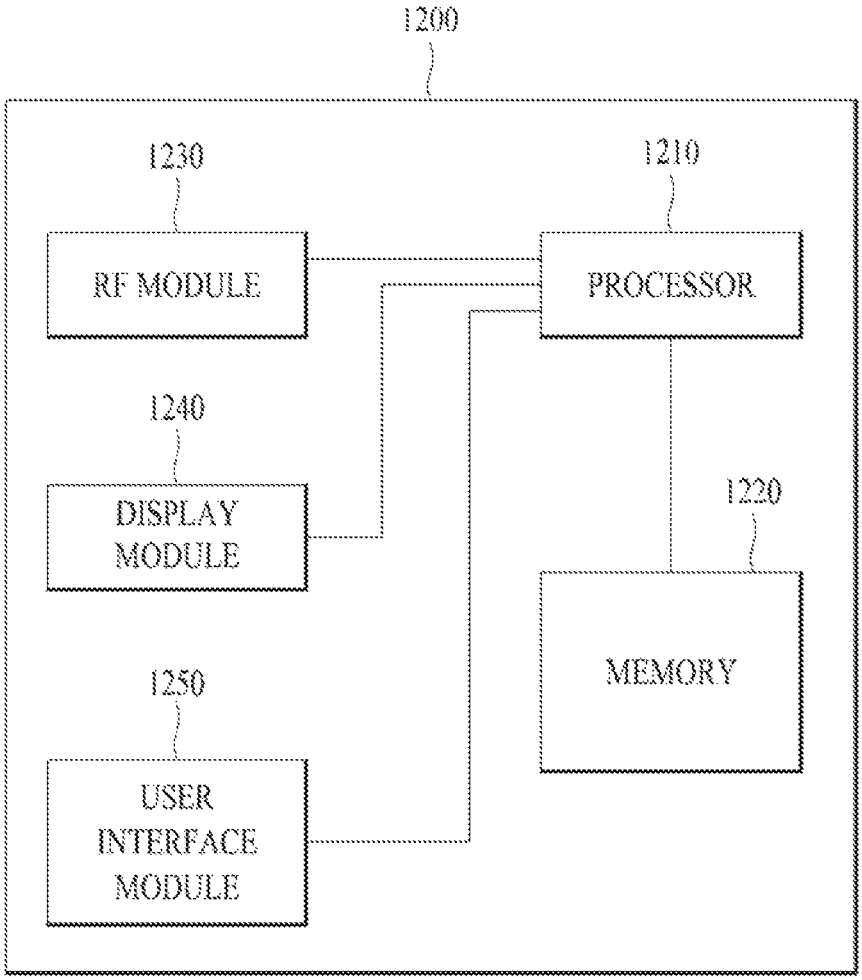
FIG. 12 is a block diagram illustrating a communication device according to an embodiment of the present invention.

FIG. 12 is a block diagram illustrating a communication device according to an embodiment of the present invention.

Referring to FIG. 12, a communication device 1200 includes a processor 1210, a memory 1220, a radio frequency (RF) module 1230, a display module 1240, and a user interface module 1250.

The communication device 1200 is illustrated for convenience of description and some modules may be omitted. The communication device 1200 may further include necessary modules. Some modules of the communication device 1200 may be further divided into sub-modules. The processor 1210 is configured to perform operations according to the embodiments of the present invention exemplarily described with reference to the drawings. Specifically, for a detailed description of operations of the processor 1210, reference may be made to the statements described with reference to FIGS. 1 to 11.

The memory 1220 is connected to the processor 1210 and stores operating systems, applications, program code, data, and the like. The RF module 1230 is connected to the processor 1210 and performs a function of converting a baseband signal into a radio signal or converting a radio signal into a baseband signal. For this, the RF module 1230 performs analog conversion, amplification, filtering, and frequency upconversion or performs inverse processes thereof. The display module 1240 is connected to the processor 1210 and displays various types of information. The display module 1240 may include, but is not limited to, a well-known element such as a liquid crystal display (LCD), a light emitting diode (LED), or an organic light emitting diode (OLED). The user interface module 1250 is connected to the processor 1210 and may include a combination of well-known user interfaces such as a keypad and a touchscreen.

The above-described embodiments are combinations of elements and features of the present invention in a predetermined manner. Each of the elements or features may be considered selective unless mentioned otherwise. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, claims that are not explicitly dependent on each other may of course be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of a firmware or software configuration, an embodiment of the present invention may be implemented by a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While a method for performing high-speed handover in an eNB-coordinated wireless communication system and an apparatus therefor have been described in the context of a 3GPP LTE system, the present invention is also applicable to many other wireless communication systems in addition to the 3GPP LTE system.

The invention claimed is:

1. A method for performing handover by a user equipment (*UE*) in a wireless communication system, the method comprising:

[receiving a random access triggering signal from a serving cell;

performing a random access procedure with a target cell based on the random access triggering signal;

receiving a downlink signal from the serving cell and transmitting an uplink signal to the target cell;]

receiving, *by the UE from a serving base station* (*BS*), a handover command message [indicating] *which commands the UE to perform* handover to [the] *a* target [cell from the serving cell] *BS, the handover command message including first information indicating whether a random access procedure to the target BS is to be skipped*;

*performing, by the UE, the handover to the target BS without performing the random access procedure to the target BS, based on that the first information indicates the random access procedure to the target BS is to be skipped;* and transmitting[a prescribed], *by the UE to the target BS based on a specific timing advance* (*TA*), *an uplink signal including a handover completion* message indicating [completion of] *that the* handover to the target [cell based on the handover command message] *BS is completed at the UE,*

*wherein the handover command message includes second information regarding a TA, based on that the first information indicates the random access procedure to the target BS is to be skipped,*

*wherein the UE obtains the specific TA from the second information regarding the TA in the handover command message based on that the first information indicates the random access procedure is to be skipped,*

*wherein the specific TA is a TA which has been used by the UE prior to the handover to the target BS and the second information indicates that the specific TA is to be reused for the target BS after the handover to the target BS, and*

*wherein the handover command message includes third information about a cell-radio network temporary identity* (*C-RNTI*) *to be used by the UE in the target BS.*

[2. The method according to claim 1, wherein the handover command message includes information indicating that the random access procedure is omitted.]

[3. The method according to claim 2, wherein the handover command message includes information about a temporary user equipment identity to be used by the user equipment in the target cell.]

4. The method according to claim [2] *1*, wherein the handover command message includes information *used* for transmitting a scheduling request message by the [user equipment] *UE* to the target [cell] *BS*.

5. The method according to claim 1, wherein the serving [cell is a macro base station and the target cell is a pico base station] *BS and the target BS are different eNodeBs* (*eNBs*) *in the wireless communication system*.

[6. The method according to claim 1, wherein the serving cell is a primary component carrier and the target cell is a secondary component carrier.]

[7. The method according to claim 6, wherein the secondary component carrier is reconfigured as the primary component carrier after the prescribed message is transmitted.]

8. The method according to claim 1, wherein the [prescribed] *handover completion* message is *related to* a scheduling request message.

9. The method according to claim 1, wherein [the] *a* random access triggering signal is received through a physical control channel from the serving [cell] *BS*.

10. The method according to claim 1, further comprising*:* receiving a downlink signal from the target [cell] *BS;* and transmitting [an] *another* uplink signal to the target [cell] *BS*, after transmitting the [prescribed] *uplink signal including the handover completion* message, wherein a power control process of the [user equipment] *UE* is maintained before and after the [prescribed] *handover completion* message is transmitted.

*11. The method according to claim 1, further comprising:*

*monitoring, by the UE, a control channel signal of the target BS based on the C-RNTI included in the handover command message.*

*12. The method according to claim 11, wherein the uplink signal transmission is performed based on the control channel signal of the target BS.*

*13. The method according to claim 1, wherein the uplink signal transmission is performed based on the C-RNTI included in the handover command message.*

*14. The method according to claim 1, wherein the handover command message includes fourth information regarding an uplink resource allocated to the UE for transmission of the uplink signal to the target BS.*

*15. The method according to claim 1, further comprising:*

*determining whether the handover to the target BS is successful or failed based on whether a control channel signal of the target BS is received within a predetermined time duration.*

*16. A non-transitory medium readable by a processor and recorded thereon one or more instructions that cause the processor to perform operations including:*

*a reception procedure of a handover command message from a serving base station (BS), wherein the handover command message commands the processor to perform handover to a target BS, and the handover command message includes first information indicating whether a random access procedure to the target BS is to be skipped, second information regarding a timing advance (TA) based on that the first information indicates the random access procedure to the target BS is to be skipped, and third information about a cell-radio network temporary identity (C-RNTI) to be used by the processor in the target BS;*

*obtaining a specific TA from the second information regarding the TA in the handover command message based on that the first information indicates the random access procedure is to be skipped, wherein the specific TA is a TA which has been used by the processor prior to the handover to the target BS and the second information indicates that the specific TA is to be reused for the target BS after the handover to the target BS;*

*performing the handover to the target BS without performing the random access procedure to the target BS, based on that the first information indicates the random access procedure to the target BS is to be skipped; and*

*a transmission procedure of an uplink signal to the target BS based on the specific TA, the uplink signal including a handover completion message indicating that the handover to the target BS is completed at the processor.*

*17. A device for wireless communication, comprising:*

*a radio frequency (RF) module; and*

*a processor controlling the RF module:*

*to receive, from a serving base station (BS), a handover command message which commands the device to perform handover to a target BS, the handover command message including first information indicating whether a random access procedure to the target BS is to be skipped,*

*to perform the handover to the target BS without performing the random access procedure to the target BS, based on that the first information indicates the random access procedure to the target BS is to be skipped, and*

*to transmit, to the target BS based on a specific timing advance (TA), an uplink signal including a handover completion message indicating that the handover to the target BS is completed at the device,*

*wherein the handover command message includes second information regarding a TA, based on that the first information indicates the random access procedure to the target BS is to be skipped,*

*wherein the processor obtains the specific TA from the second information regarding the TA in the handover command message based on that the first information indicates the random access procedure is to be skipped,*

*wherein the specific TA is a TA which has been used by the device prior to the handover to the target BS and the second information indicates that the specific TA is to be reused for the target BS after the handover to the target BS, and*

*wherein the handover command message includes third information about a cell-radio network temporary identity (C-RNTI) to be used by the device in the target BS.*

* * * * *